(12) United States Patent
Hsu et al.

(10) Patent No.: US 9,944,030 B2
(45) Date of Patent: Apr. 17, 2018

(54) METHOD AND EQUIPMENT FOR MANUFACTURING LIGHT GUIDE PLATE

(71) Applicant: Wistron Corporation, New Taipei (TW)

(72) Inventors: Ching-Fu Hsu, New Taipei (TW); Jia-Chi You, New Taipei (TW); Chien-Wei Chen, New Taipei (TW)

(73) Assignee: Wistron Corporation, New Taipei (TW)

( * ) Notice: Subject to any disclaimer, the term of this patent is extended or adjusted under 35 U.S.C. 154(b) by 287 days.

(21) Appl. No.: 15/060,613

(22) Filed: Mar. 4, 2016

(65) Prior Publication Data

US 2016/0185058 A1    Jun. 30, 2016

Related U.S. Application Data

(62) Division of application No. 13/936,233, filed on Jul. 8, 2013, now abandoned.

(30) Foreign Application Priority Data

Dec. 14, 2012   (TW) .............................. 101147553 A

(51) Int. Cl.
| | |
|---|---|
| *B29D 11/00* | (2006.01) |
| *B29C 45/14* | (2006.01) |
| *B29L 11/00* | (2006.01) |
| *F21V 8/00* | (2006.01) |

(52) U.S. Cl.
CPC .. *B29D 11/00721* (2013.01); *B29C 45/14065* (2013.01); *B29C 45/14827* (2013.01); *B29D 11/00326* (2013.01); *B29D 11/00663* (2013.01); *B29D 11/00798* (2013.01); *G02B 6/0065* (2013.01); *B29C 2045/14532* (2013.01); *B29L 2011/0075* (2013.01); *G02B 6/0051* (2013.01); *G02B 6/0053* (2013.01)

(58) Field of Classification Search
CPC ........ B29D 11/00721; B29D 11/00663; B29D 11/00326; B29D 11/00798; B29C 45/14065; B29C 45/14827; G02B 6/0065
See application file for complete search history.

(56) References Cited

U.S. PATENT DOCUMENTS

| | | | | |
|---|---|---|---|---|
| 2002/0181224 | A1* | 12/2002 | Tahara | B29C 45/372 362/616 |
| 2008/0026200 | A1* | 1/2008 | Kim | B29C 33/42 428/304.4 |
| 2010/0019411 | A1* | 1/2010 | Fukumoto | B29C 45/045 264/299 |
| 2014/0151932 | A1* | 6/2014 | Hung | B29C 45/14778 264/328.17 |

* cited by examiner

*Primary Examiner* — Mathieu Vargot
(74) *Attorney, Agent, or Firm* — Winston Hsu

(57) ABSTRACT

In a backlight module, a diffusive structure and a prism structure are replaced by a diffusive prism film formed on a substrate and transferred via In-Mold Decoration by Roller (IMR) to a light guide body via injection molding. A reflection film is also transferred to an opposite side of the light guide body via the same way. In such way, optical films may be readily transferred to the light guide body via two-side IMR during the process of injection molding of the light guide body, saving room taken by substrates of the optical components.

14 Claims, 14 Drawing Sheets

METHOD AND EQUIPMENT FOR MANUFACTURING LIGHT GUIDE PLATE

CROSS REFERENCE TO RELATED APPLICATIONS

This application is a divisional of U.S. nonprovisional application Ser. No. 13/936,233, which was filed on Jul. 8, 2013, now abandoned, and is incorporated herein by reference.

BACKGROUND

1. Field

The disclosure relates to a method and equipment for manufacturing a light guide plate, and more particularly, to a light guide plate, a method, and an equipment for manufacturing the light guide plate that integrates a diffusive prism film on the light guide body.

2. Description of the Prior Art

A conventional backlight module includes a variety of components. When lights is generated by a source like the LED module or the CCFL module, it travels between each optical component and a Fresnel loss may happen where reflection occurs at the boundaries of the medium, and accordingly the overall efficiency of the backlight module will be compromised. Improvement to the panel or the backlight module is necessary so that the optical quality at the front side of the display is acceptable.

Compared with the panel module, the backlight module has more to be improved, as the fact that the light source is disposed therein and fewer optical components exist in the backlight module than in the panel module.

On the other hand, in pursuit of the improvement on the thickness of a flat panel display, the key concern is about to reduce the thickness of the backlight module. Currently, one can always find a reflective plate, a light guide plate, a diffusive plate, and a prism plate stacking in order as the necessary components for a backlight module, whereas the light source is disposed at a side of the light guide plate for an edge-type backlight module. The light guide plate guides the travelling lights from a side source to a plane source, the diffusive plate puts the diffusion effect on the lights emitting from the light guide plate, and the prism plate further aligns the scatter-like lights from the diffusive plate to travel in one direction via the refraction of prisms thereon and also concentrates the lights.

These components are indispensable for a conventional backlight module and they take up a certain amount of thickness of the backlight module. This places a limit to the improvement on the thickness of a flat panel display and to the improvement of the light efficiency of a backlight module.

SUMMARY OF THE DISCLOSURE

To provide a lighter and thinner backlight module, so that the limitation caused by the nature of a conventional backlight module may be properly dealt with, embodiments of the disclosure provide a light guide plate with micro structures processed via two-side in-mold decoration, and a method and an equipment for manufacturing such light guide plate.

An embodiment of the disclosure provides a method for manufacturing a light guide plate. The method includes following steps: forming a diffusive prism film on a substrate, attaching the diffusive prism film and the substrate to a first mold and using a first pressing frame for clamping edges of the diffusive prism film, injecting plastics into a mold cavity formed between the first mold and a second mold for forming a light guide body, and separating the light guide body from the first mold and the second mold. When the light guide body is separated from the first mold, the diffusive prism film is transferred onto a first surface of the light guide body such that a light guide plate is formed.

In the method for manufacturing a light guide plate of the disclosure, the step of forming a diffusive prism film on a substrate includes following steps: forming micro structures on the substrate via hot embossing, coating a de-bonding layer on the substrate, coating a decorative film on the de-bonding layer and forming micro structures on the decorative film wherein the decorative film contains diffusive particles, and coating an adhesive layer on the decorative film, while separating the light guide body from the first mold and the second mold includes separating the substrate and the de-bonding layer from the decorative film of the diffusive prism film.

In the method for manufacturing a light guide plate of the disclosure, the step of forming a diffusive prism film on a substrate includes following steps: coating a consolidated layer on the substrate, forming micro structures on the consolidated layer via hot embossing and consolidating the consolidated layer, coating a decorative film on the consolidated layer and forming micro structures on the decorative film wherein the decorative film contains diffusive particles, and coating an adhesive layer on the decorative film, while separating the light guide body from the first mold and the second mold includes separating the substrate and the consolidated layer from the decorative film of the diffusive prism film.

In the method for manufacturing a light guide plate of the disclosure, the first mold includes a channel and a sprue connected between the channel and the mold cavity. The pore size of the sprue is greater than the pore size of the channel. The substrate and the diffusive prism film include a through hole corresponding to the location of the sprue. The first pressing frame includes an isolating part corresponding to the location of the sprue. The isolating part includes a convex pore. The method further includes step: when the first pressing frame is clamping the edges of the diffusive prism film, disposing the isolating part of the first pressing frame at the sprue for connecting the convex pore to the channel and positioning the isolating part between the sprue and the through hole.

The method for manufacturing a light guide plate of the disclosure further includes following step: attaching a reflective film to the second mold and using a second pressing frame for clamping edges of the reflective film, and when the light guide body is separated from the second mold, the reflective film is transferred onto a second surface of the light guide body.

In another embodiment, the disclosure provides an equipment for manufacturing a light guide plate. The equipment includes a first mold, a second mold, and a first pressing frame. The first mold includes a channel and a sprue having pore size greater than the pore size of the channel. The second mold is assembled with the first mold such that a mold cavity is formed therebetween. The sprue of the first mold is connected between the channel and the mold cavity. The first pressing frame is adapted for being assembled to the first mold so as to clamp a transfer film to the first mold. The first pressing frame includes an isolating part corresponding to the location of the sprue. The isolating part includes a convex pore and is disposed at the sprue and the convex pore connected to the channel.

The equipment provided by the embodiment of the disclosure further includes a second pressing frame adapted for being assembled to the second mold so as to clamp a transfer film to the second mold.

The method and the equipment for manufacturing the light guide plate of the disclosure provide embodiments to implement a diffusive prism film in replacement of a diffusive structure and a prism structure. The diffusive prism film is formed on a substrate and transferred via In-Mold Decoration by Roller (IMR) to a light guide body via injection molding. The reflection film is also transferred to the opposite side of the light guide body via the same way. In such way, optical films may be readily transferred to the light guide body via two-side IMR during the process of injection molding of the light guide body, saving room taken by substrates of the optical components necessary for a conventional backlight module and also reducing the overall thickness of each key light guiding components in the backlight module.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
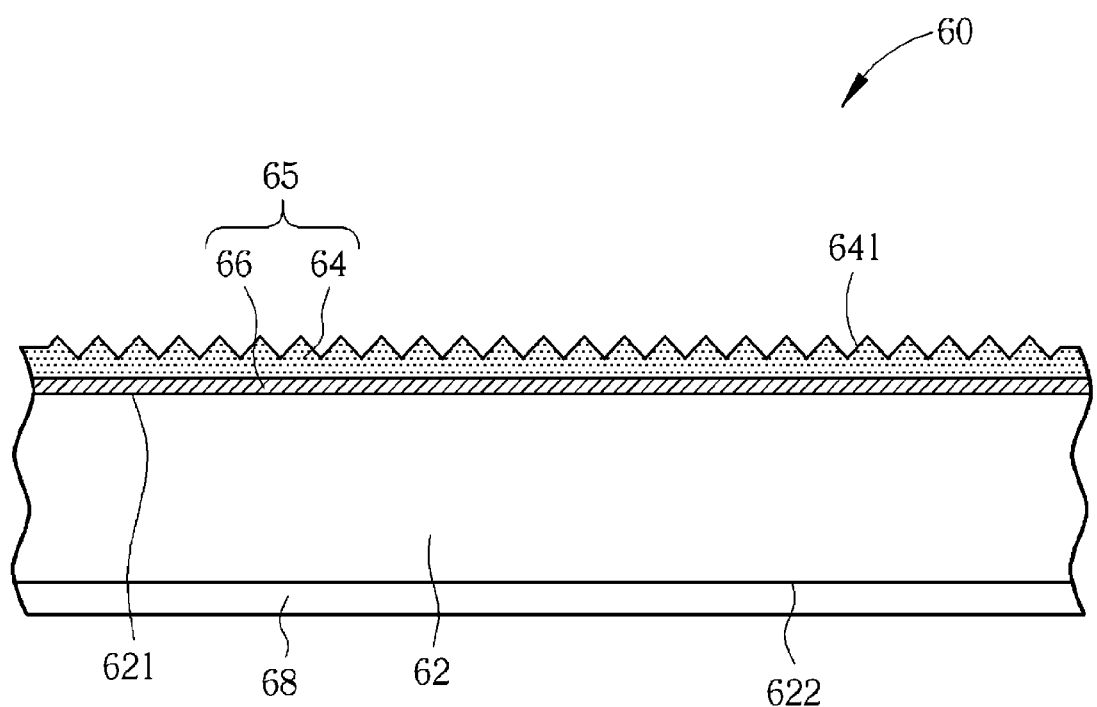
FIG. 1 is an illustration of a light guide plate (LGP) incorporated with diffusive prism film according to the disclosure.

Please refer to FIG. 1. FIG. 1 is an illustration of a light guide plate (LGP) incorporated with diffusive prism film according to the disclosure. A light guide plate 60 includes a light guide body 62, a diffusive prism film 65, and a reflective film 68. The light guide body 62 is a light-transmittable acrylic plate or polycarbonate (PC) plate, which has a first surface 621 and a second surface 622. To reduce a backlight module's overall thickness while keeping or enhancing the light conductivity of the backlight module, the light guide plate 60 has the diffusive prism film 65 disposed on the first surface 621 and the reflective film 68 disposed on the second surface 622. The diffusive prism film 65 includes a decorative film 64 and an adhesive layer 66. The adhesive layer 66 is attached to the first surface 621 of the light guide body 62 via In-Mold Decoration by Roller (IMR) and the reflective film 68 may be attached to the second surface 622 of the light guide body 62 also via In-Mold Decoration by Roller (IMR).

A surface of the decorative film 64, which is a surface of the decorative film 64 opposite to the adhesive layer 66, micro structures 641 like isosceles right triangular prisms are disposed thereon. The diffusive prism film 65 contains diffusive particles. The reflective film 68 is adapted to guide lights entering the light guide body 62 and going toward the second surface 622 and reflect the lights toward the first surface 621 of the light guide body 62 and the diffusive prism film 65. In other words, the light guide plate 60 provided by the disclosure in FIG. 1 has a hybrid structure composed by a light guide plate as a conventional meaning, a diffusive plate for diffusing lights from the light guide plate, a prism plate for guiding and concentrating the diffused lights from the diffusive plate, and a reflective plate for reflective lights. Such hybrid structure of the light guide plate 60 provides notably reduction in overall thickness of the module.

Figure 2:
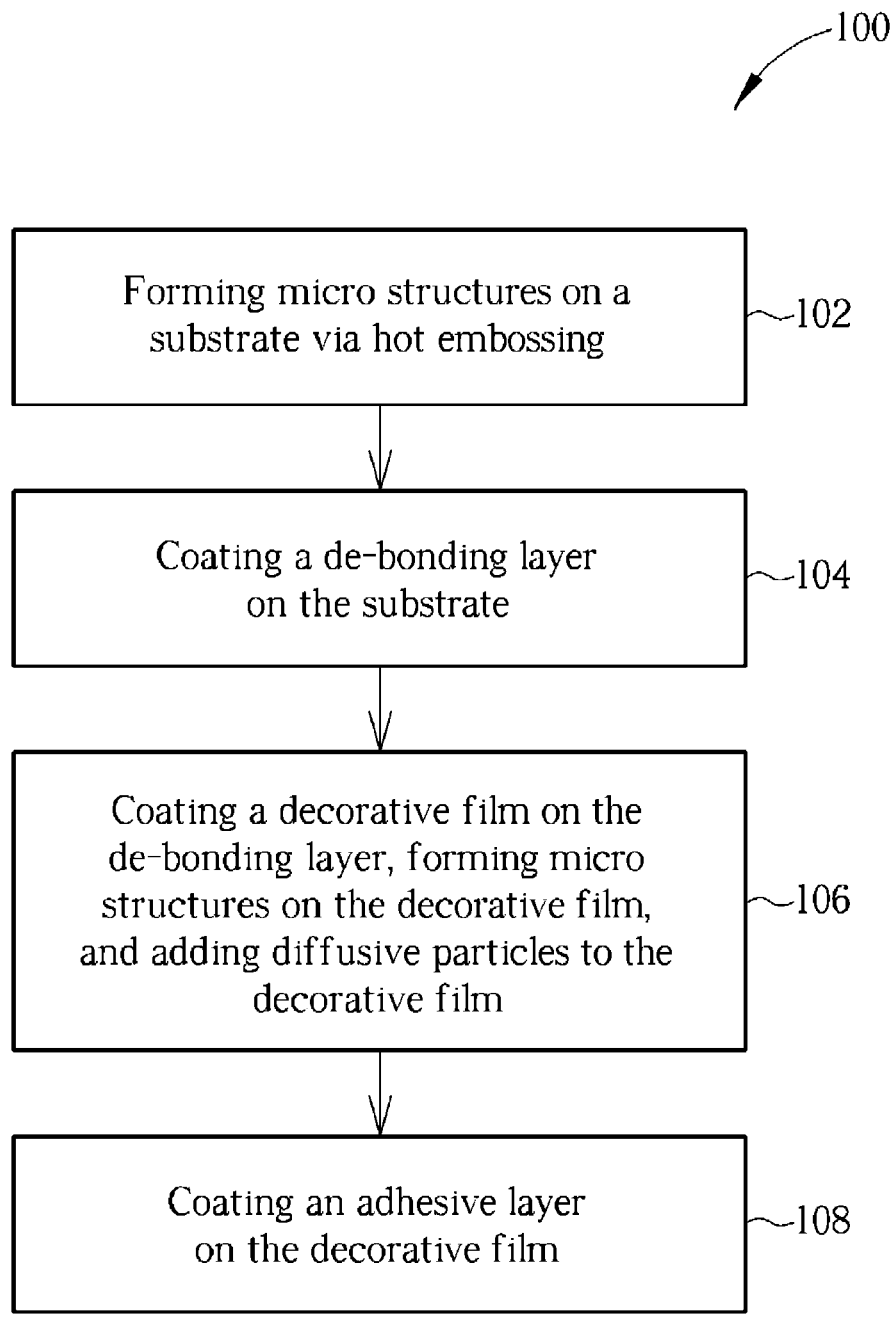
FIG. 2 is an illustration showing an embodiment of a method of forming the diffusive prism film of the light guide plate.

Please refer to FIG. 2. FIG. 2 is an illustration showing an embodiment of a method of forming the diffusive prism film of the light guide plate. In the disclosure, the diffusive prism film is manufactured in the first place, formed as a thin film on a substrate via printing technique. The film-like diffusive prism film has micro structures for diffusive purpose. It will be further transferred to the light guide body using In-Mold Decoration by Roller (IMR) technique. The method 100 of forming the diffusive prism film includes following steps:

Step 102: Forming micro structures on a substrate via hot embossing;

Step 104: Coating a de-bonding layer on the substrate;

Step 106: Coating a decorative film on the de-bonding layer, forming micro structures on the decorative film, and adding diffusive particles to the decorative film;

Step 108: Coating an adhesive layer on the decorative film.

The micro structures 641 are formed on the diffusive prism film 65 by use of the substrate as a medium. Please refer to FIG. 13 together, which includes an illustration of the diffusive prism film 65 and any intermediate diagrams of the diffusive prism film 65 during the process implemented with the method 100 in FIG. 2. In Step 102, micro structures 72 are formed on a substrate 70 via hot embossing in the first place. The micro structures 72 may be preferably three-dimensional parts like isosceles right triangular prisms, processed on the substrate 70 via hot embossing, a simple and cost efficient way. The substrate 70 may be PC plastics or PET plastics with preferable thickness between 0.025 mm and 0.1 mm.

Next in Step 104, a de-bonding layer 74 is coated on the surface of the micro structures 72 of the substrate 70 and the de-bonding layer 74 consequently built up shape with the micro structures 72. In Step 106, the decorative film 64 is coated on the de-bonding layer 74; practically, plastic resin is coated thereon and dried in shape. The proximity of the decorative film 64 to the surface of the de-bonding layer 74 makes up micro structures 641 on the decorative film 64 in correspondence with the shape of the de-bonding layer 74. Adding diffusive particles to the diffusive prism film 65 makes the diffusive prism film 65 diffusible for lights.

Last in Step 108, an adhesive layer 66 is coated on the decorative film 64 so that the decorative film 64 may be fixedly attached to an target object during the later IMR process. The adhesive layer 66 may be preferably using reactive thermoplastic polyurethane, reactive aminovite, UV bridging resin, or reactive silicon gel. Additionally, the substrate 70, the de-bonding layer 74, the decorative film 64, and the adhesive layer 66 make up a transfer film 80.

Figure 3:
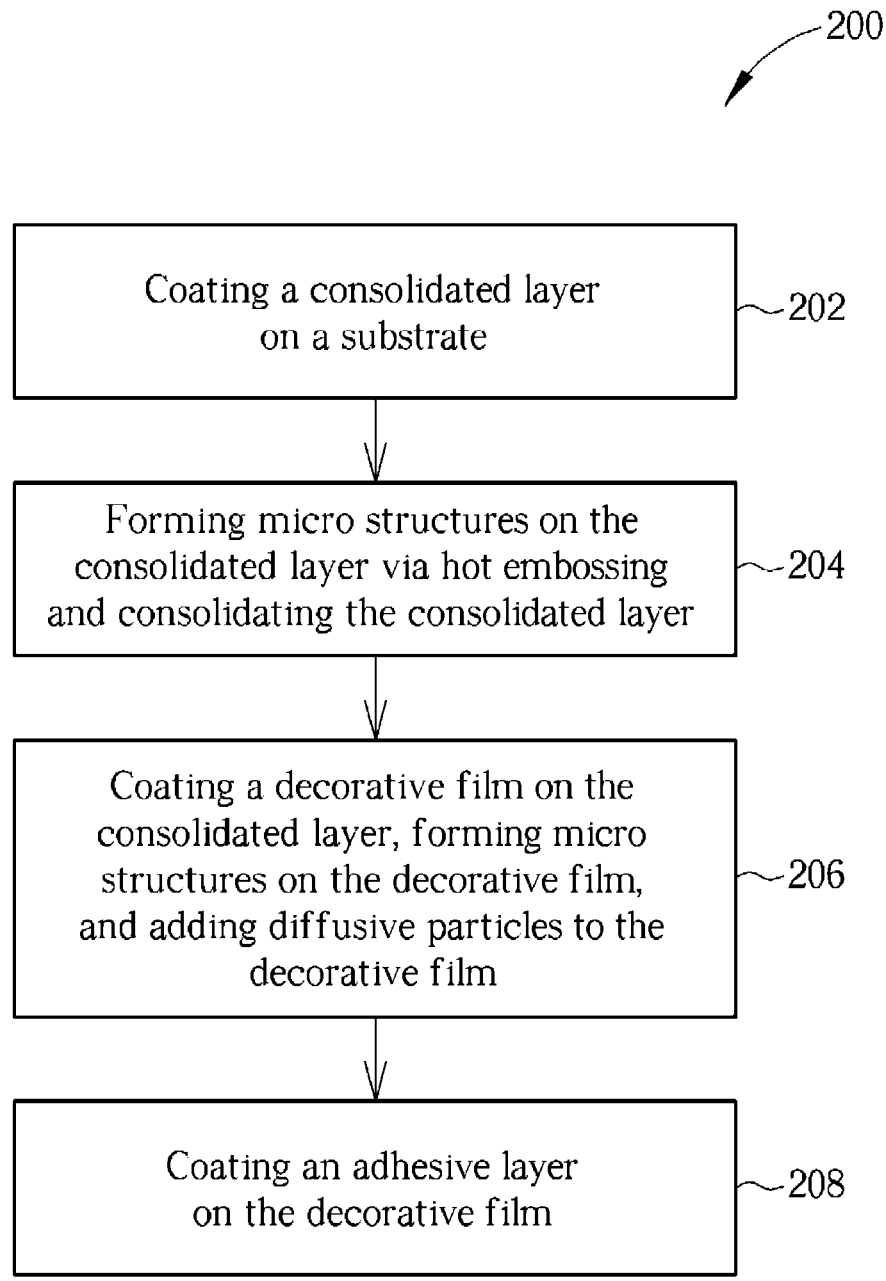
FIG. 3 is an illustration showing another embodiment of a method of forming the diffusive prism film of the light guide plate.

Please refer to FIG. 3. FIG. 3 is an illustration showing another embodiment of a method of forming the diffusive prism film of the light guide plate. Another method may be implemented to form the transfer film 80. A method 200 of forming the diffusive prism film includes following steps:
Step 202: Coating a consolidated layer on a substrate;
Step 204: Forming micro structures on the consolidated layer via hot embossing and consolidating the consolidated layer;
Step 206: Coating a decorative film on the consolidated layer, forming micro structures on the decorative film, and adding diffusive particles to the decorative film;
Step 208: Coating an adhesive layer on the decorative film.

Figure 14:
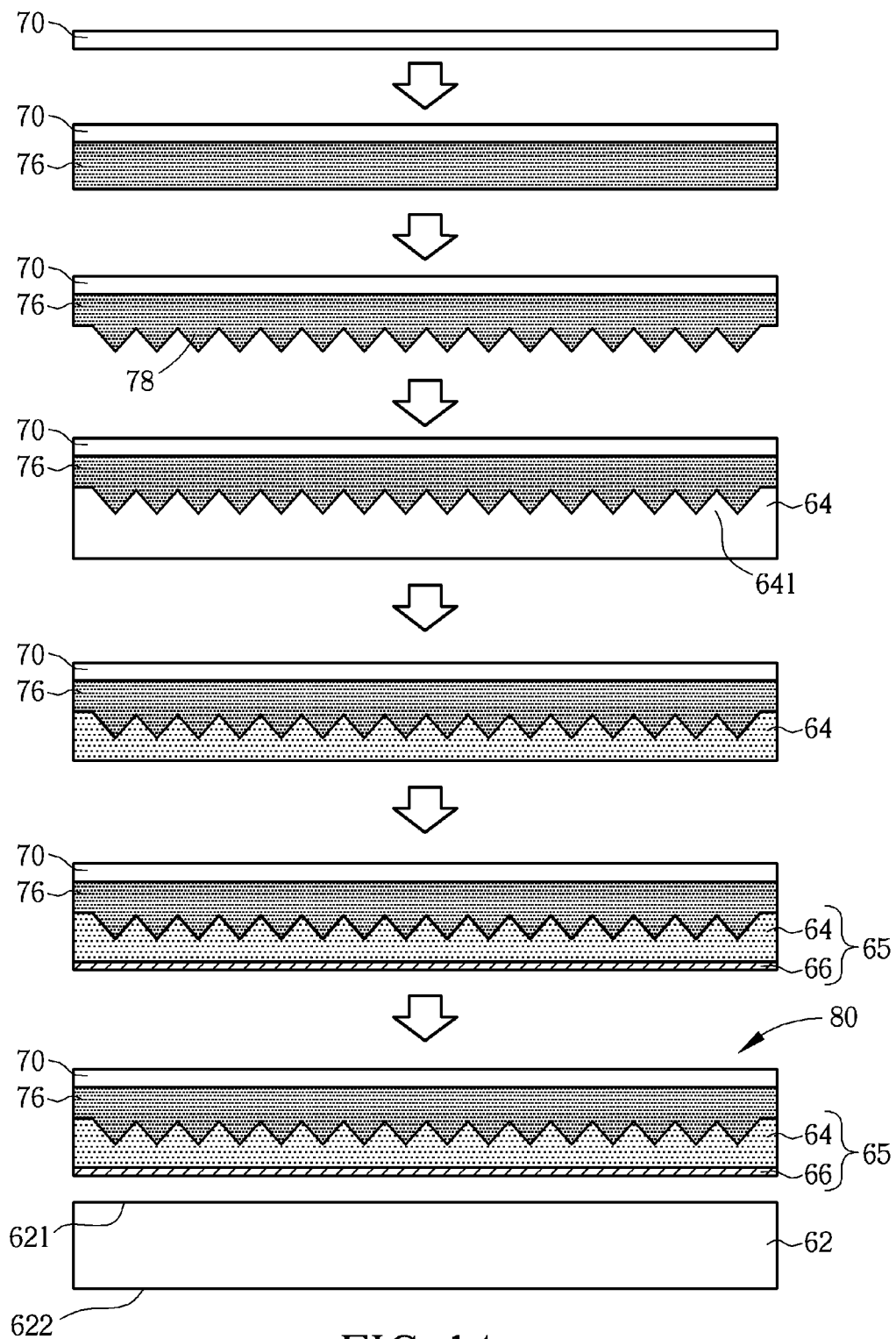
FIG. 14 is an illustration showing every stages of how the diffusive prism film is made and transferred onto the light guiding body according to the method in FIG. 3.

Please refer to FIG. 14 together, which includes an illustration of the diffusive prism film 65 and any intermediate diagrams of the diffusive prism film 65 during the process implemented with the method 200 in FIG. 3. In Step 202, resin is coated on the surface of the substrate 70 as a consolidated layer 76, which is a 20 μm thick, unhardened film.

Next in Step 204, micro structures 78 are formed on the unhardened consolidated layer 76 via screen printing or rolling embossing by using a roller having micro structures, and in the mean time, the consolidated layer 76 is being hardened under the process of UV irradiation or roasting. In Step 206, the decorative film 64 is coated on the consolidated layer 76; practically, plastic resin is coated thereon and dried in shape. The proximity of the decorative film 64 to the surface of the consolidated layer 76 makes up micro structures 641 on the decorative film 64 in correspondence with the shape of the consolidated layer 76. Adding diffusive particles to the diffusive prism film 65 makes the diffusive prism film 65 diffusible for lights.

Last in Step 208, an adhesive layer 66 is coated on the decorative film 64 so that the decorative film 64 may be fixedly attached to an target object during the later IMR process. Additionally, the substrate 70, the consolidated layer 76, the decorative film 64, and the adhesive layer 66 make up a transfer film 80.

Figure 4:
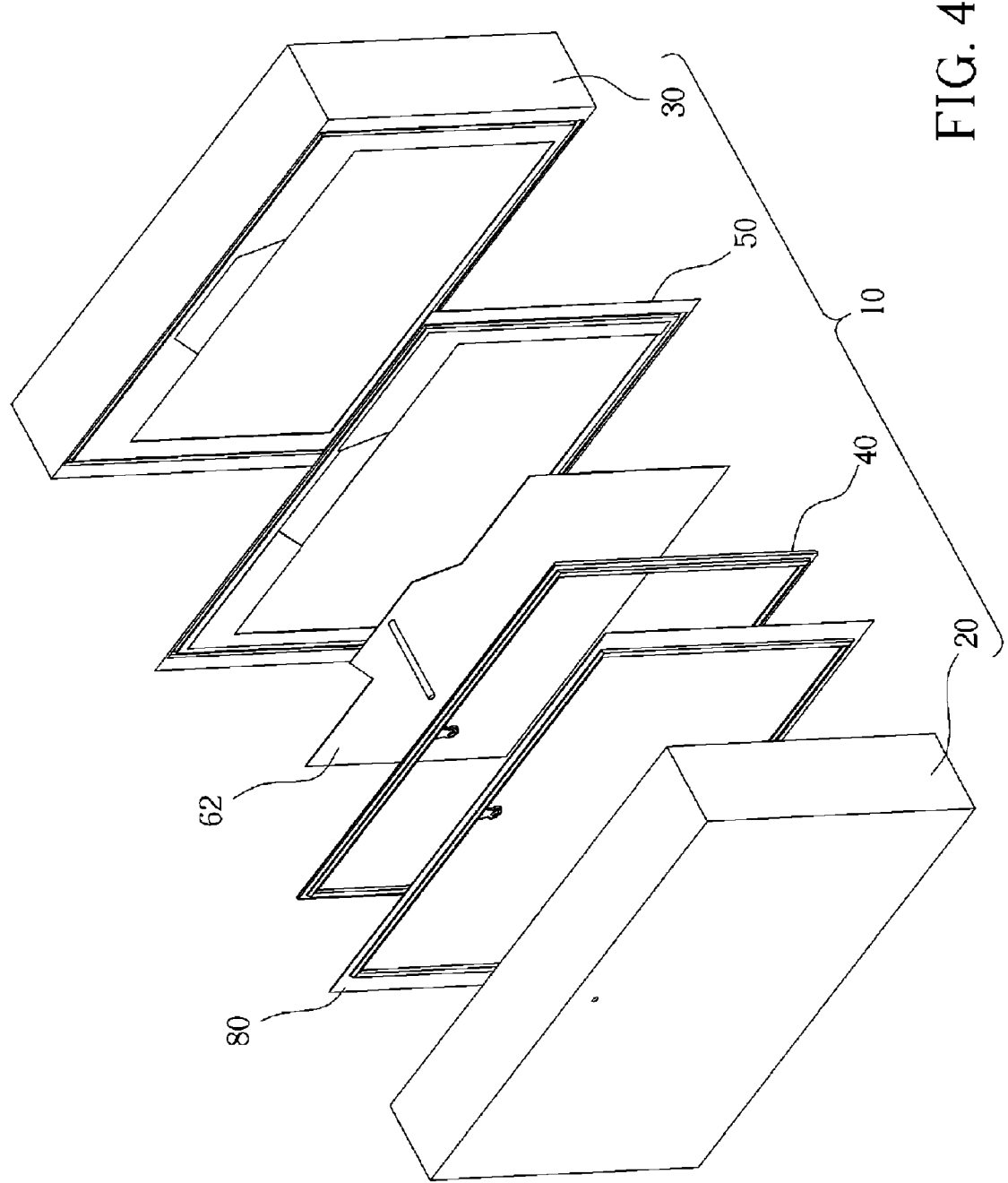
FIG. 4 is an illustration of an equipment for manufacturing a light guide plate, a light guide plastics, and a transfer film.

Please refer to FIG. 4. FIG. 4 is an illustration of an equipment for manufacturing a light guide plate, a light guide plastics, and a transfer film. The disclosure provides a way of manufacturing the light guide plate using equipment with In-Mold Decoration by Roller (IMR). In FIG. 4, an equipment 10 includes a first mold 20, a second mold 30, a first pressing frame 40, and a second pressing frame 50. The equipment 10 with two-side in-mold decoration is adapted to transfer the reflective film 68 and the diffusive prism film 65 onto the light guide body 62, whereas one-side in-mold transfer is also an available option by implementing such equipment 10 to transfer the diffusive prism film 65 or the reflective film 68 onto the light guide body 62 in the process of manufacturing the light guide plate. FIG. 4 shows a relative position between the first mold 20, the transfer film 80 including the diffusive prism film 65, the first pressing frame 40, the light guide body 62, the second pressing frame 50, and the second mold 30.

Figure 5:
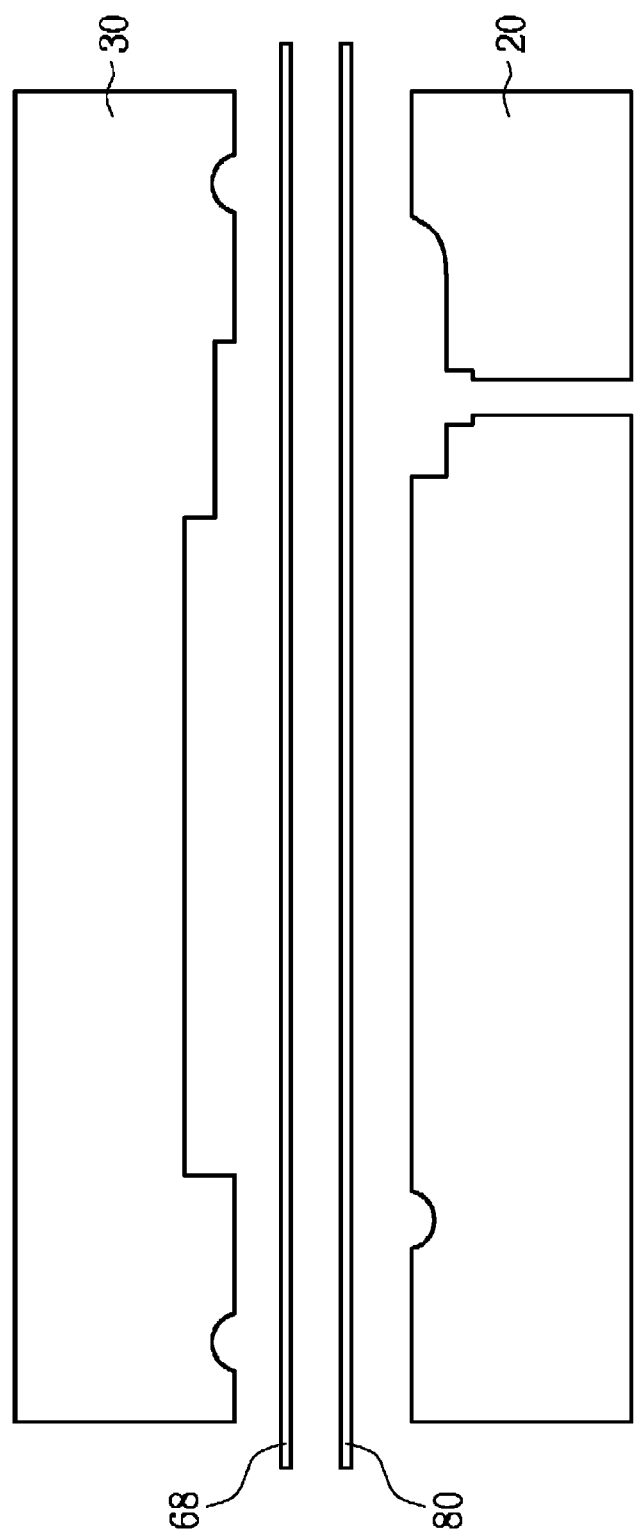
FIG. 5 is an illustration showing the first mold, the second mold, the transfer film, and the reflective film before the process of two-side in-mold decoration.
Figure 6:
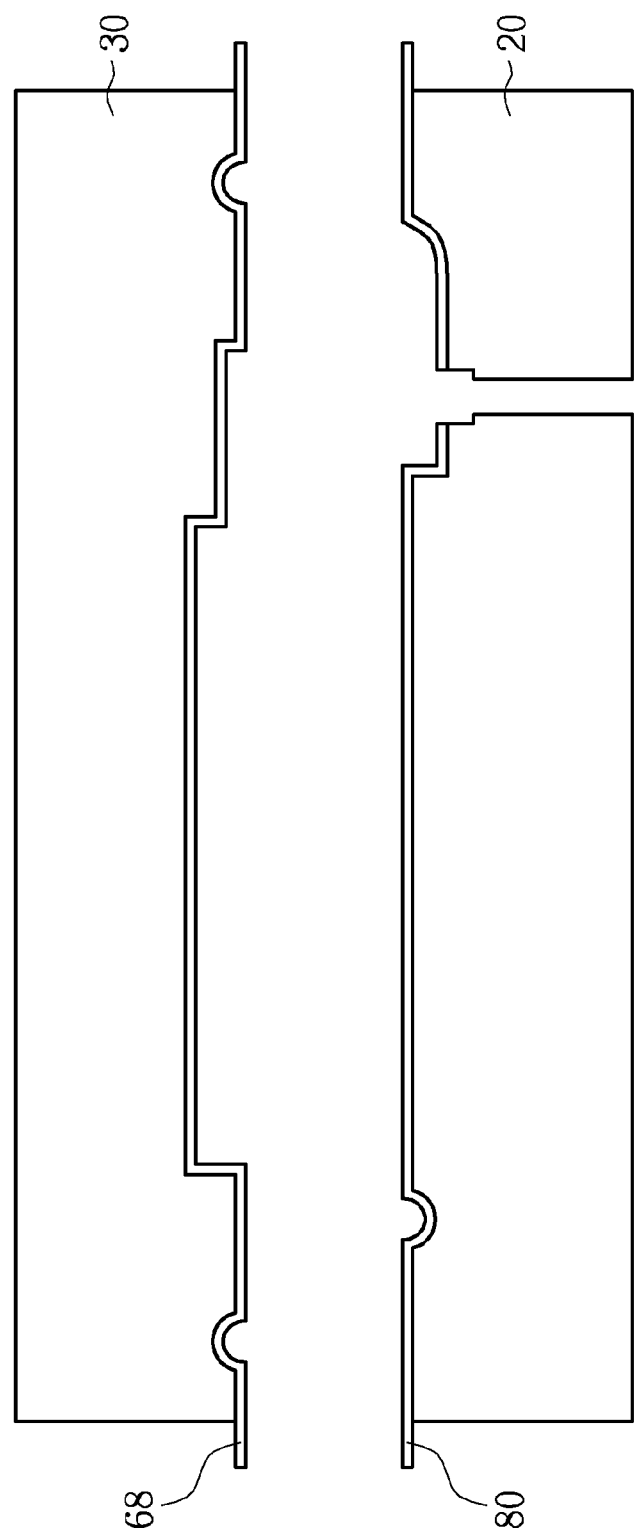
FIG. 6 is an illustration showing a status that the transfer film and the reflective film are respectively attached to the first mold and the second mold for the two-side in-mold decoration.

Please refer to FIG. 5 and FIG. 6. FIG. 5 is an illustration showing the first mold 20, the second mold 30, the transfer film 80, and the reflective film 68 before the process of two-side in-mold decoration. FIG. 6 is an illustration showing a status that the transfer film 85 and the reflective film 68 are respectively attached to the first mold 20 and the second mold 30 for the two-side in-mold decoration.

Figure 7:
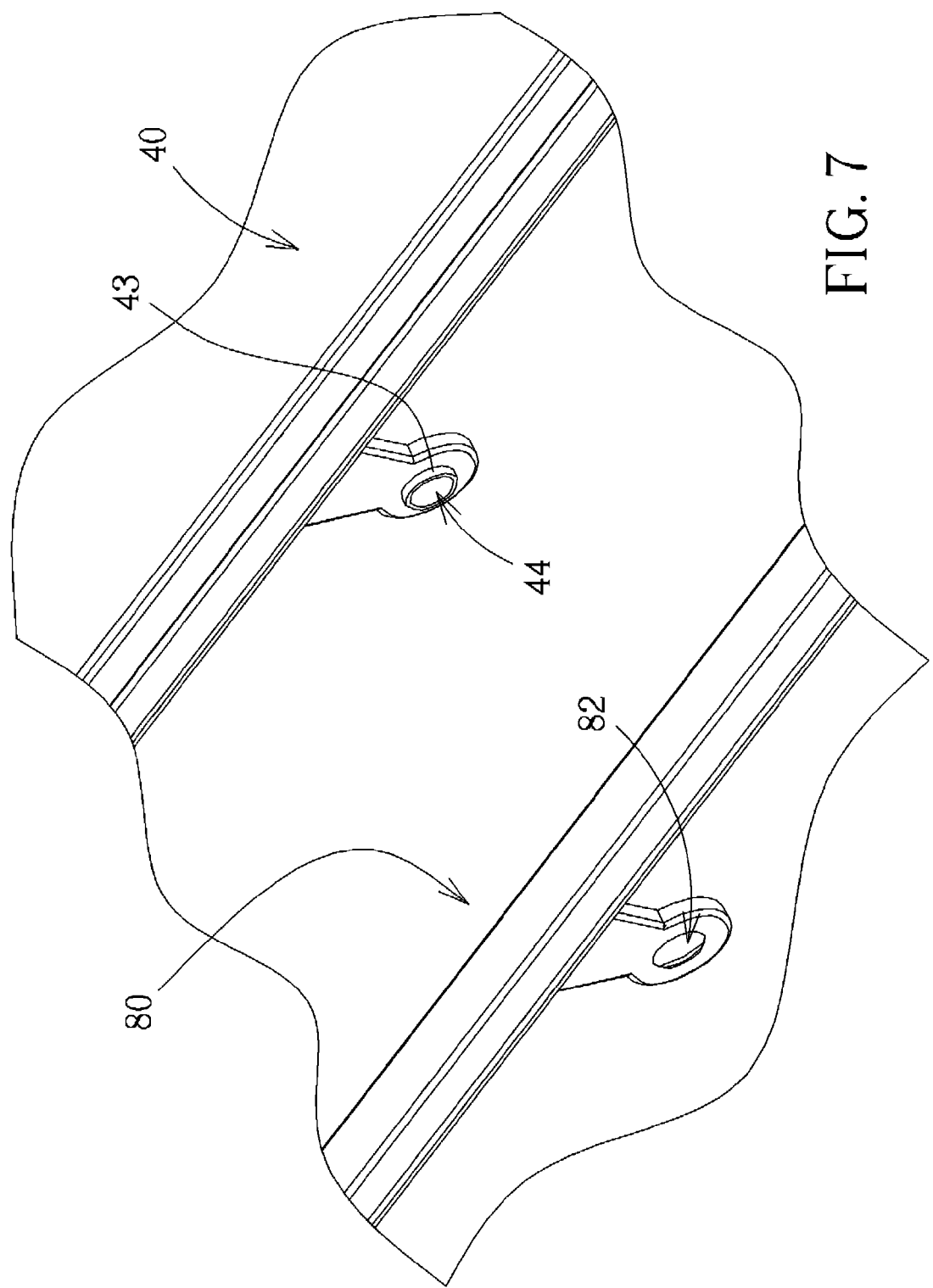
FIG. 7 is an illustration showing a plastic injection region of the first pressing frame and the transfer film.
Figure 8:
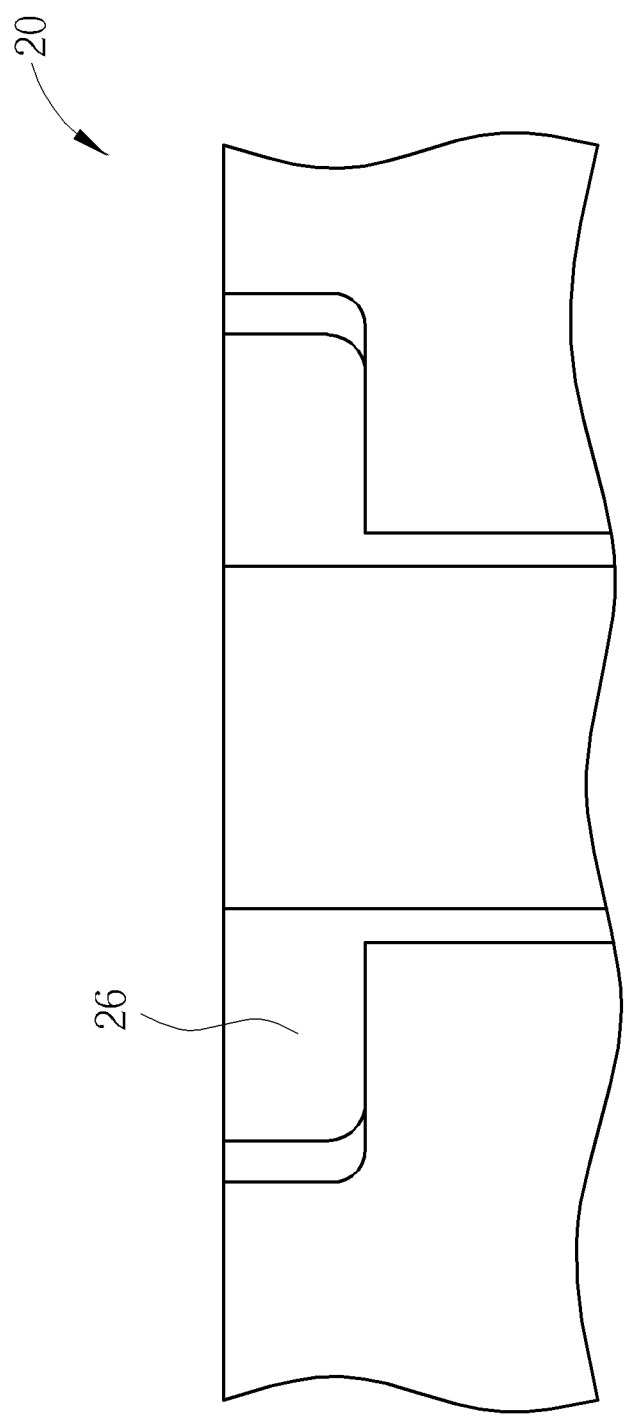
FIG. 8 is an illustration of a side sectional view of the plastic injection region of the first mold.
Figure 9:
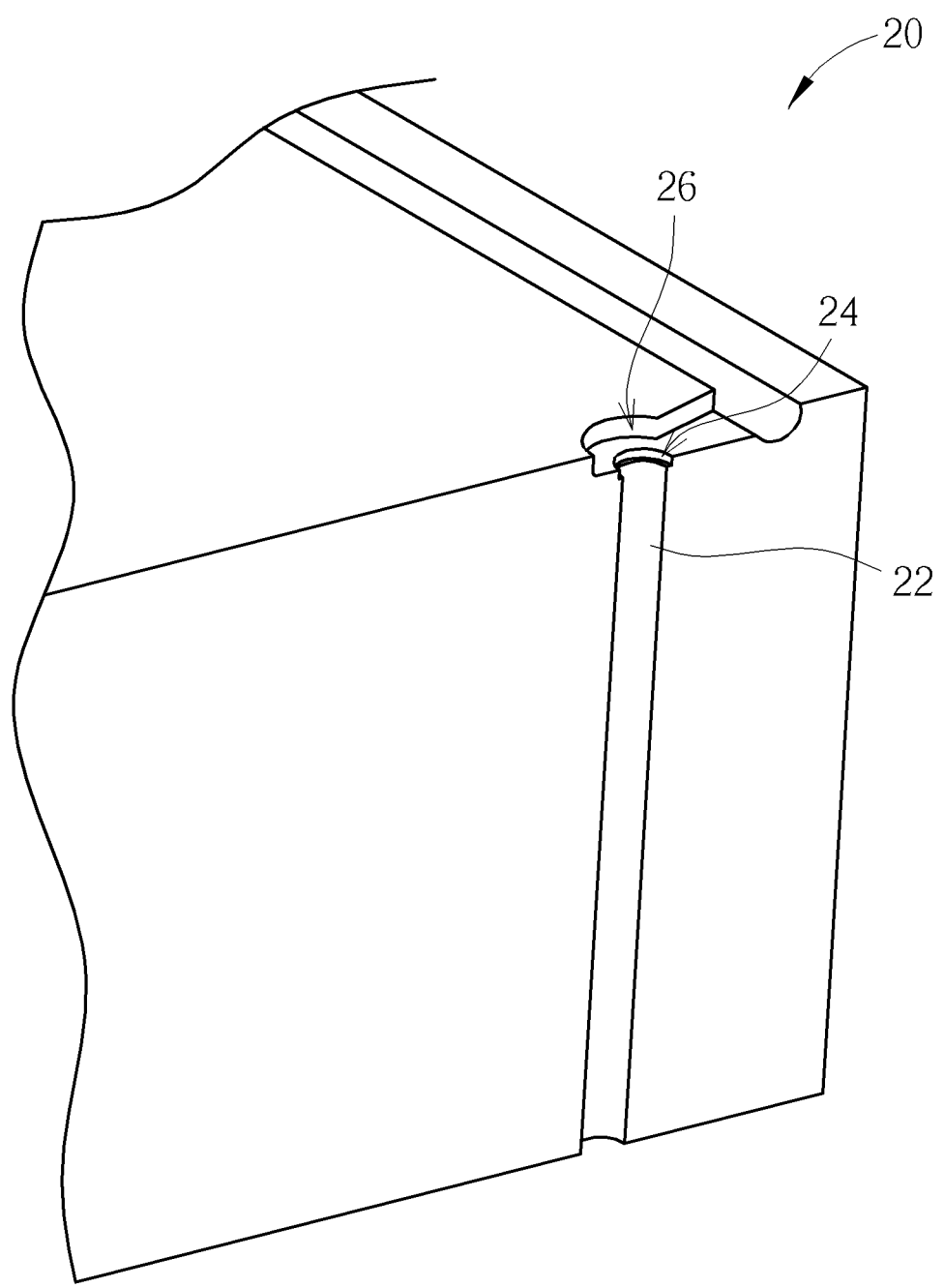
FIG. 9 is an illustration showing a perspective sectional view of the plastic injection region of the first mold.
Figure 10:
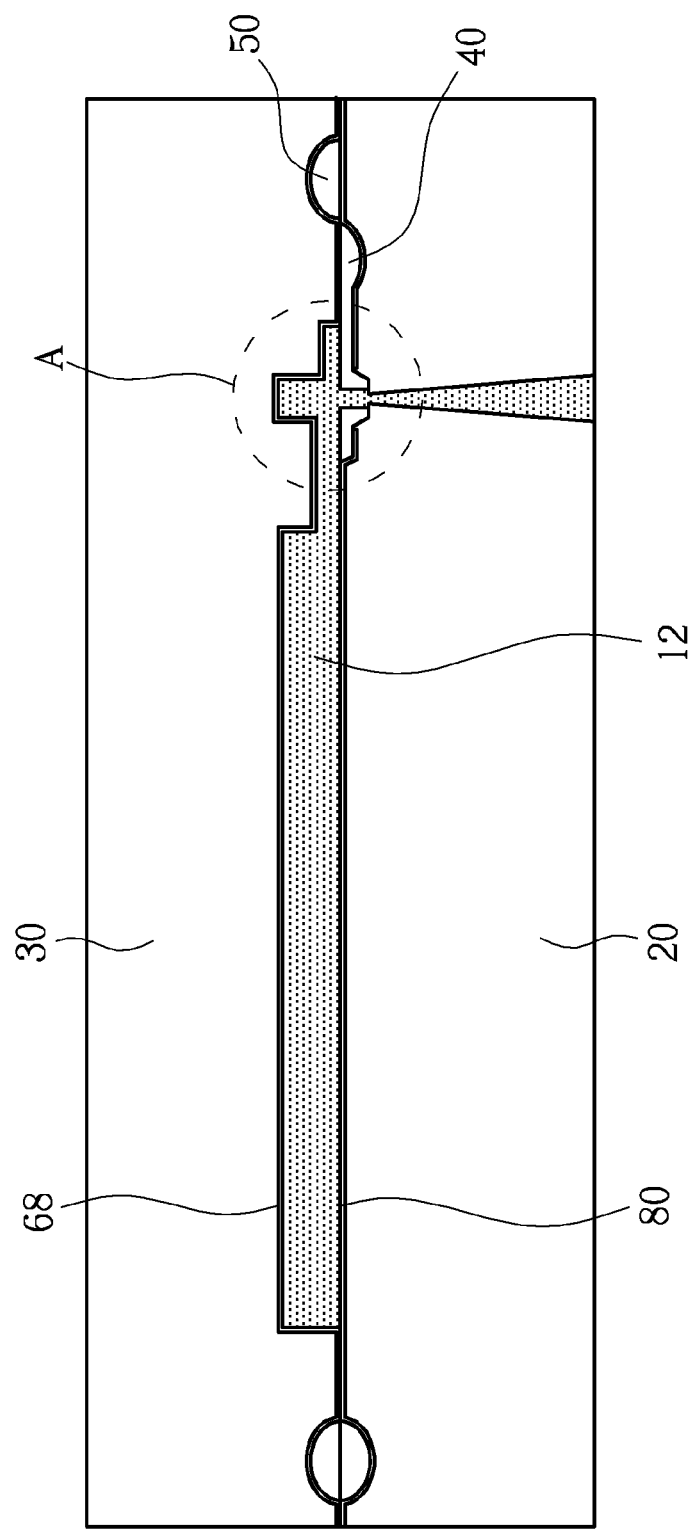
FIG. 10 is an illustration of the equipment with the transfer film attached therein and a mold cavity formed therein for injection of plastics.
Figure 11:
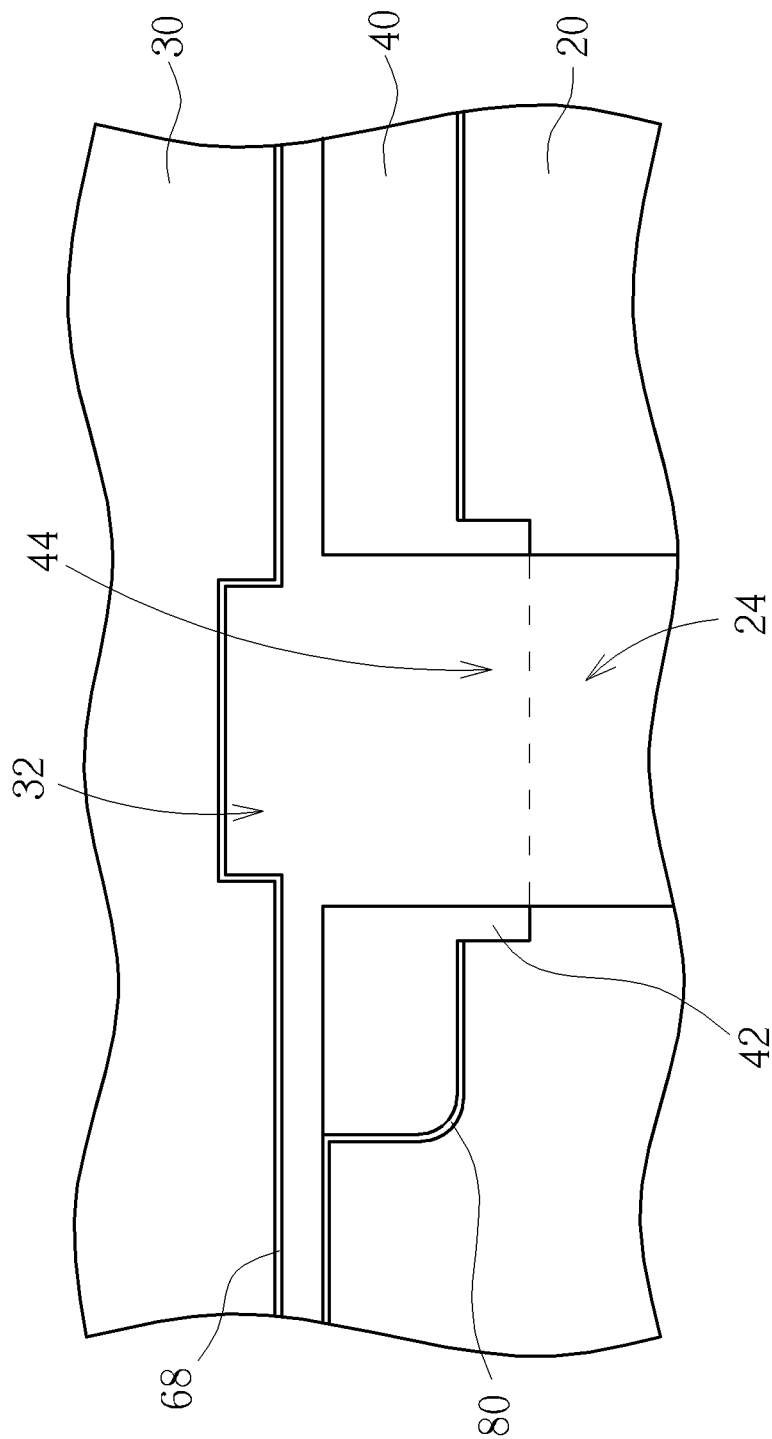
FIG. 11 is an illustration of an enlarged view of area A in FIG. 10.

Please refer to FIG. 7 to FIG. 11. FIG. 7 is an illustration showing a plastic injection region of the first pressing frame 40 and the transfer film 80, FIG. 8 is an illustration of a side sectional view of the plastic injection region of the first mold 20, FIG. 9 is an illustration showing a perspective sectional view of the plastic injection region of the first mold 20, FIG. 10 is an illustration of the equipment with the transfer film attached therein and a mold cavity formed therein for injection of plastics, and FIG. 11 is an illustration of an enlarged view of area A in FIG. 10.

In the process of two-side in-mold decoration injection, the equipment 10 prevents the plastics with high temperature and high pressure at the entrance of the first mold 20 from direct contact with the transfer film that could damage the transfer film. This is achieved by the specific structure of the first pressing frame 40 that provides a protection to the part of transfer film 80 at the sprue.

FIG. 10 shows that a mold cavity 12 will be formed when the first mold 20 and the second mold 30 are assembled. FIG. 9 shows that the first mold 20 includes a channel 22 and a sprue 24 connected between the channel 22 and the mold cavity 12. In the embodiment, the pore size of the sprue 24 is greater than the pore size of the channel 22. As the transfer film 80 and the reflective film 68 are respectively attached to the first mold 20 and the second mold 30 through vacuum suction as shown in FIG. 6, FIG. 10 further shows that the first pressing frame 40 is assembled to the first mold 20 so as to clamp the transfer film 80 to the first mold 20, while the second pressing frame 50 is assembled to the second mold 30 so as to clamp a transfer film, the reflective film 68 in this embodiment, to the second mold 30. The second pressing frame 50 and the reflective film 68 may also be omitted in embodiments of one-side in-mold decoration. In still another embodiments, the transfer film 80 may be disposed at the second mold 30 and be clamped by the second pressing frame 50 to the second mold 30, whereas the first frame 40 is omitted.

In FIG. 7, the transfer film 80 has a through hole 82 located near the location of the sprue 24 giving a way for plastics may be injected into the mold cavity 12 from the sprue 24. Since part of the transfer film 80 is near the sprue 24 in the equipment 10, when the plastics is injected from the sprue 24, the wash effect may be caused by the plastics toward the transfer film 80, and the high temperature of the plastics may damage the transfer film 80. Hence, the first pressing frame 40 includes an isolating part 42 corresponding to the location of the sprue 24 and the isolating part 42 has a convex pore 44 designed for protecting the transfer film 80 from being damaged.

As shown in FIG. 8, FIG. 9, and FIG. 11, the first mold 20 has a concaved part 26 surrounding the sprue 24 and when the first pressing frame 40 is assembled with the first mold 20, the isolating part 42 of the first pressing frame 40 fits into the concaved part 26 and is disposed at the sprue 24, whereas the convex pore 44 is connected to the channel 22, which is shown in FIG. 11. As the isolating part 42 fits into the concaved part 26, the isolating part 42 has passed through the through hole 82 of the transfer film 80 in that the transfer film 80 may be isolated from the plastics passing through the sprue 24, keeping away the direct wash and damage from the plastics to the transfer film 80. Additionally, the second mold 30 includes a well 32 corresponding to the location of the sprue 24, providing a buffer for the plastics.

Figure 12:
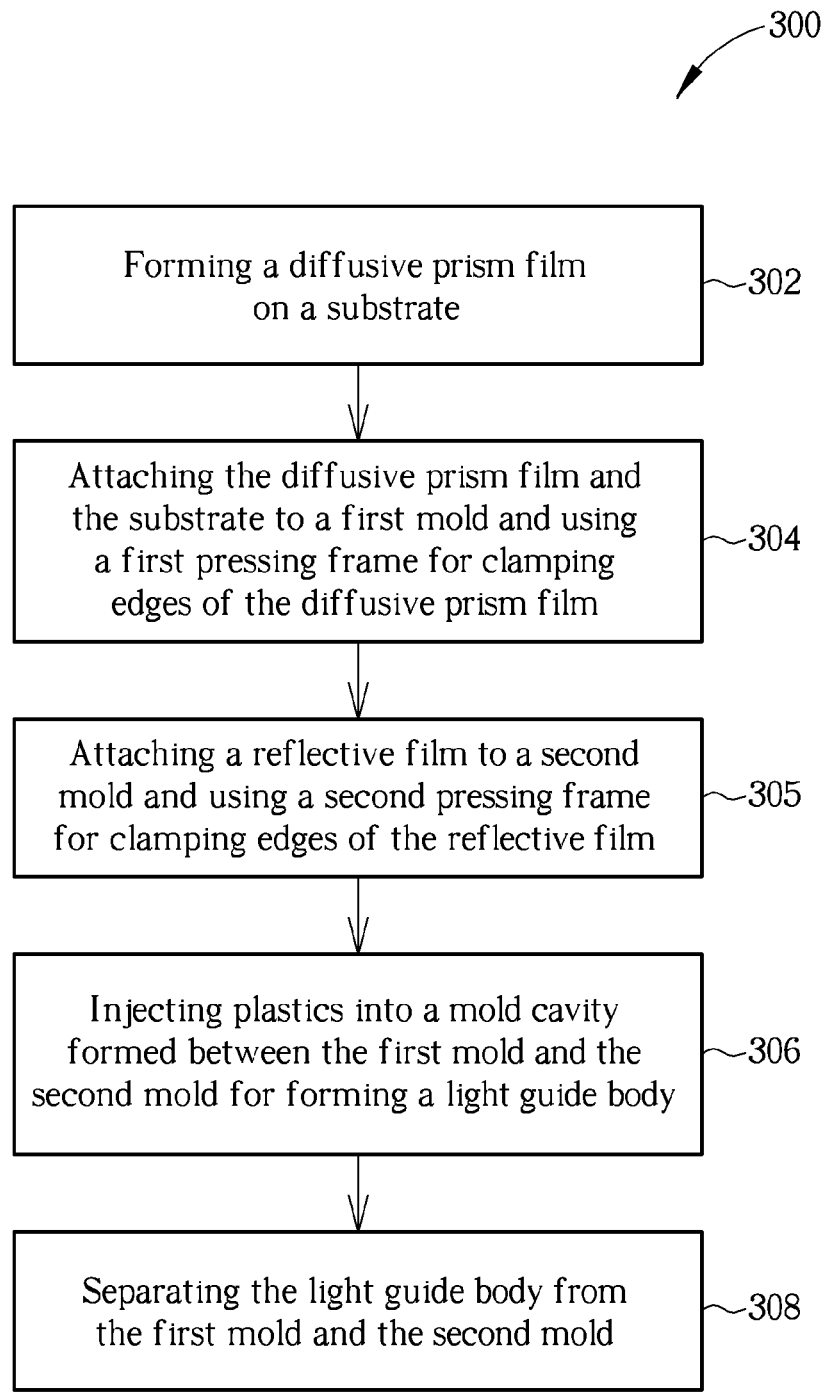
FIG. 12 is an illustration of a flow chart of a method for manufacturing a light guide plate according to the disclosure.

Please refer to FIG. 12. FIG. 12 is an illustration of a flow chart of a method for manufacturing a light guide plate according to the disclosure. A method 300 for manufacturing the light guide plate includes following steps:

Step 302: Forming a diffusive prism film on a substrate;
Step 304: Attaching the diffusive prism film and the substrate to a first mold and using a first pressing frame for clamping edges of the diffusive prism film;
Step 305: Attaching a reflective film to a second mold and using a second pressing frame for clamping edges of the reflective film;
Step 306: Injecting plastics into a mold cavity formed between the first mold and the second mold for forming a light guide body;
Step 308: Separating the light guide body from the first mold and the second mold.

The method 300 utilizes equipment 10 with two-side in-mold decoration feature that can transfer films on both sides of the a light guide body so as to integrate the reflective component, the light guide body, the diffusive component, and the prism component of a backlight module into a single component. In Step 302, the process of making the diffusive prism film 65, such as the diffusive prism film 65 incorporated with the substrate 70 as a transfer film 80, may be referred to the method 100 or method 200 in FIG. 2 or FIG. 3, which provide details of making the transfer film 80.

After the diffusive prism film 65, having features of both a diffusive plate and a prism plate, is formed on the substrate 70, the transfer film 80 and the reflective film 68 are respectively attached to the molds and clamped by the pressing frames as provided in Step 304, Step 305, also in FIG. 5 and FIG. 6. Step 305 may also be omitted for one-side in-mold decoration process.

Next in Step 306, plastics is injected into the mold cavity 12 formed by the first mold 20 and the second mold 30, during which process, the light guide body 62 is formed therein and the transfer film 80 and the reflective film 68 on the first mold 20 and the second mold 30 are respectively transferred onto the sides of the light guide body 62 so that a light guide plate 60 is formed. It should be noted that in Step 304, as the first pressing frame 40 is clamping the edges of the diffusive prism film 65, the isolating part 42 of the first pressing frame 40 is disposed to correspond the sprue 24 of the first mold 20 and the convex pore 44 of the isolating part 42 has connection with the channel 22 of the first mold 20, positioning the isolating part 42 between the sprue 24 and the through hole 82 of the transfer film 80.

Figure 13:
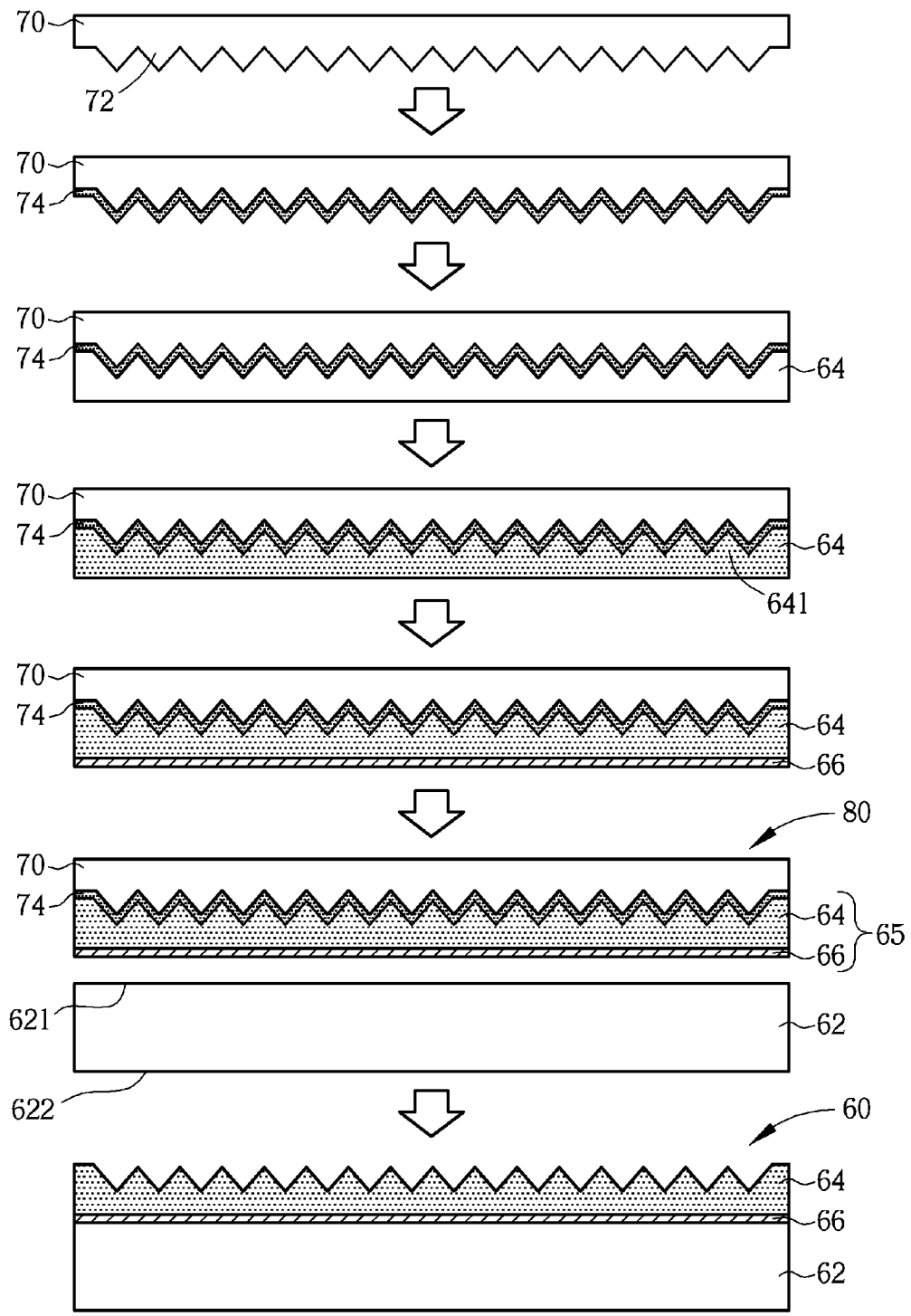
FIG. 13 is an illustration showing every stages of how the diffusive prism film is made and transferred onto the light guiding body according to the method in FIG. 2.

Please also refer to FIG. 13 and FIG. 14. FIG. 13 is an illustration showing every stages of how the diffusive prism film is made and transferred onto the light guiding body according to the method in FIG. 2, and FIG. 14 is an illustration showing every stages of how the diffusive prism film is made and transferred onto the light guiding body according to the method in FIG. 3. The steps of how to form the diffusive prism film are described in previous paragraphs.

In Step 308, as the light guide plate 60 is separated from the first mold 20 and the second mold 30, the de-bonding layer 74 or the consolidated layer 76 of the transfer film 80 allows detachment of the diffusive prism film 65 from the substrate 70, i.e., the diffusive prism film 65 will be transferred onto the first surface 621 of the light guide body 62. For two-side in-mold decoration process, the reflective film 68 on the second mold 30 will also be transferred onto the second surface 622 of the light guide body 62.

The disclosure uses printing technique to produce on the substrate 70 the diffusive prism film 65 with diffusiveness and light-guiding micro structures first, and then transfer the diffusive prism film 65 onto the light guide body 62. The equipment 10 for manufacturing such light guide plate 60 makes use of two-side in-mold decoration by Roller (IMR) to transfer the diffusive prism film 65 and the reflective film 68 onto both sides of the light guide body 62 at the same time, thereby producing a component having reflective, light guiding, diffusive, and prism-like features all in one piece of module, saving most substrates used in a conventional backlight module and extensively reducing the overall thickness of the optical module. The structure of the disclosure also provides shortest path for lights to travel to the panel with least consumption of lights.

Regarding the light guide plate, the method and the equipment for manufacturing the light guide plate, the disclosure provides embodiments to implement a diffusive prism film in replacement of a diffusive structure and a prism structure. The diffusive prism film is formed on a substrate and transferred via In-Mold Decoration by Roller (IMR) to a light guide body via injection molding. The reflection film is also transferred to the opposite side of the light guide body via the same way. In such way, optical films may be readily transferred to the light guide body via two-side IMR during the process of injection molding of the light guide body, saving room taken by substrates of the optical components necessary for a conventional backlight module and also reducing the overall thickness of each key light guiding components in the backlight module.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for manufacturing a light guide plate, comprising following steps:
   forming a diffusive prism film on a substrate;
   attaching the diffusive prism film and the substrate to a first mold and using a first pressing frame for clamping edges of the diffusive prism film;
   injecting plastics into a mold cavity formed between the first mold and a second mold for forming a light guide body; and
   separating the light guide body from the first mold and the second mold;

wherein when the light guide body is separated from the first mold, the diffusive prism film is transferred onto a first surface of the light guide body such that a light guide plate is formed.

2. The method of claim 1, wherein forming a diffusive prism film on a substrate comprising following steps:
forming micro structures on the substrate via hot embossing;
coating a de-bonding layer on the substrate;
coating a decorative film on the de-bonding layer and forming micro structures on the decorative film, wherein the decorative film contains diffusive particles; and
coating an adhesive layer on the decorative film.

3. The method of claim 2, wherein separating the light guide body from the first mold and the second mold comprising:
separating the substrate and the de-bonding layer from the decorative film of the diffusive prism film.

4. The method of claim 3, wherein forming a diffusive prism film on a substrate comprising following steps:
coating a consolidated layer on the substrate;
forming micro structures on the consolidated layer via hot embossing and consolidating the consolidated layer;
coating a decorative film on the consolidated layer and forming micro structures on the decorative film, wherein the decorative film contains diffusive particles; and
coating an adhesive layer on the decorative film.

5. The method of claim 4, wherein separating the light guide body from the first mold and the second mold comprising:
separating the substrate and the consolidated layer from the decorative film of the diffusive prism film.

6. The method of claim 5, wherein the first mold comprises a channel and a sprue connected between the channel and the mold cavity, the pore size of the sprue greater than the pore size of the channel, the substrate and the diffusive prism film comprising a through hole corresponding to the location of the sprue, the first pressing frame comprising an isolating part corresponding to the location of the sprue, the isolating part comprising a convex pore, the method further comprising step:
when the first pressing frame is clamping the edges of the diffusive prism film, disposing the isolating part of the first pressing frame at the sprue for connecting the convex pore to the channel and positioning the isolating part between the sprue and the through hole.

7. The method of claim 6, further comprising step:
attaching a reflective film to the second mold and using a second pressing frame for clamping edges of the reflective film;
wherein when the light guide body is separated from the second mold, the reflective film is transferred onto a second surface of the light guide body.

8. The method of claim 1, wherein forming a diffusive prism film on a substrate comprising following steps:
coating a consolidated layer on the substrate;
forming micro structures on the consolidated layer via hot embossing and consolidating the consolidated layer;
coating a decorative film on the consolidated layer and forming micro structures on the decorative film, wherein the decorative film contains diffusive particles; and
coating an adhesive layer on the decorative film.

9. The method of claim 8, wherein separating the light guide body from the first mold and the second mold comprising:
separating the substrate and the consolidated layer from the decorative film of the diffusive prism film.

10. The method of claim 1, wherein the first mold comprises a channel and a sprue connected between the channel and the mold cavity, the pore size of the sprue greater than the pore size of the channel, the substrate and the diffusive prism film comprising a through hole corresponding to the location of the sprue, the first pressing frame comprising an isolating part corresponding to the location of the sprue, the isolating part comprising a convex pore, the method further comprising step:
when the first pressing frame is clamping the edges of the diffusive prism film, disposing the isolating part of the first pressing frame at the sprue for connecting the convex pore to the channel and positioning the isolating part between the sprue and the through hole.

11. The method of claim 10, further comprising step:
attaching a reflective film to the second mold and using a second pressing frame for clamping edges of the reflective film;
wherein when the light guide body is separated from the second mold, the reflective film is transferred onto a second surface of the light guide body.

12. The method of claim 1, further comprising step:
attaching a reflective film to the second mold and using a second pressing frame for clamping edges of the reflective film;
wherein when the light guide body is separated from the second mold, the reflective film is transferred onto a second surface of the light guide body.

13. An equipment for manufacturing a light guide plate, comprising:
a first mold comprising a channel and a sprue having pore size greater than the pore size of the channel;
a second mold assembled with the first mold such that a mold cavity is formed therebetween, wherein the sprue of the first mold is connected between the channel and the mold cavity; and
a first pressing frame adapted for being assembled to the first mold so as to clamp a transfer film to the first mold, the first pressing frame comprising an isolating part corresponding to the location of the sprue, the isolating part comprising a convex pore, the isolating part disposed at the sprue and the convex pore connected to the channel.

14. The equipment of claim 13, further comprising a second pressing frame adapted for being assembled to the second mold so as to clamp a transfer film to the second mold.

* * * * *